April 2, 1957  M. TURCHAN  2,787,437
TWO AND THREE DIMENSION TRACER
Filed Sept. 11, 1953  2 Sheets-Sheet 2

INVENTOR.
MANUEL TURCHAN.
BY Robert A. Sloman
ATTORNEY

United States Patent Office 2,787,437
Patented Apr. 2, 1957

2,787,437
TWO AND THREE DIMENSION TRACER

Manuel Turchan, Dearborn, Mich.

Application September 11, 1953, Serial No. 379,615

11 Claims. (Cl. 251—3)

This application is a continuation-in-part of my co-pending application for patent Serial No. 338,840, filed February 25, 1953, now U. S. Patent 2,745,624.

This invention relates to a three dimension tracer, and more particularly to a universal type tracer responsive to the shape and contour of a pattern for controlling the movements of three slide controlling cylinders at right angles to each other.

The present invention also relates to a two dimensional tracer adapted to respond to the surface of a template for controlling the movements of two slide controlling cylinders at right angles to each other.

It is the object of the present invention to provide a novel tracer construction with the spindle projecting therefrom and responsive to the surface of a template or pattern for controlling within a tracer housing a pair of valves at right angles to each other for regulating the flow of pressure fluid to either end of a pair of slide controlling cylinders at right angles to each other.

It is the further object of the present invention to provide a hand operated tracer whereby the spindle thereof is manually disposed over or maintained in contact with various portions of a template or pattern whereby control movements of said spindle are adapted to effect the simultaneous control of three slide control cylinders arranged at right angles to each other.

It is the further object of the present invention to provide a novel tracer construction which is clearly simplified over prior structures for this purpose, and which is fully effective for the intended purpose.

These and other objects will be seen from the following specification and claims in conjunction with the appended drawings, in which:

Figure 1:
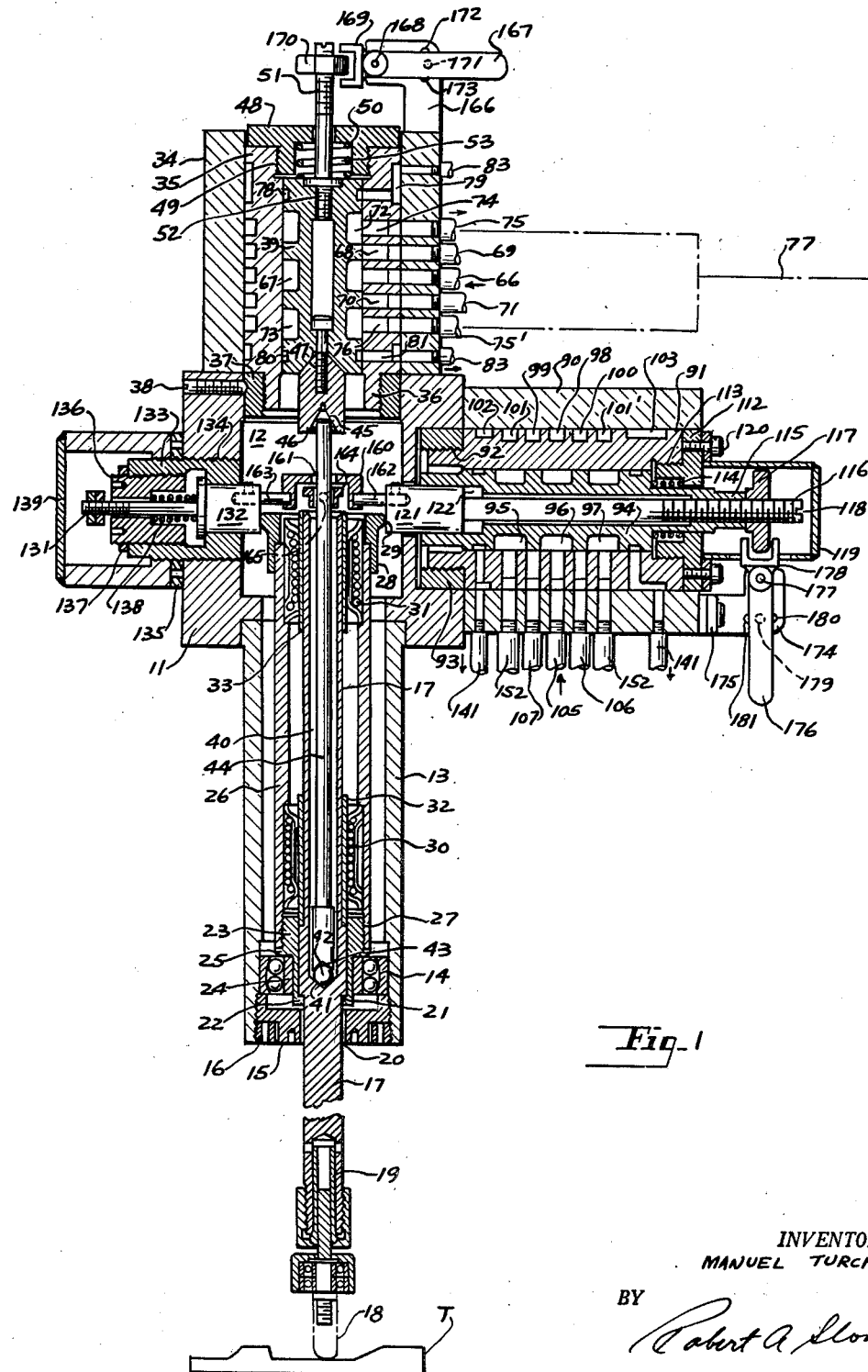
Fig. 1 is an elevational section of the three dimension tracer.

It will be understood that the above drawings illustrate merely a preferred embodiment of the invention, and that other embodiments are contemplated within the scope of the claims hereafter set forth.

Referring to the drawings, the present three dimension tracer is a manually operated tracer in the sense that the tracer tip is manually traversed in any direction over the surface of the template T. The tracer tip while in engagement with said template responds to vertical variations in the surface of said template for effecting corresponding relative vertical movements of a cutting tool with respect to a workpiece such as by controlling the vertical movements of the knee of a machine tool.

The tracer spindle is also universally mounted intermediate its ends within the tracer and tilting movements of the tracer tip in any direction in a horizontal plane are adapted to control a pair of valves within the tracer arranged at right angles to each other for regulating for example the flow of pressure fluid to either or both of a pair of slide controlling cylinders of a machine tool for effecting relative movements at right angles to each other of a pair of additional slides, which are mounted upon such knee in a conventional manner.

Referring to Fig. 1, the present tracer includes a central block 11 with a central cylindrical aperture 12 therein and with a depending tubular tracer body 13 joined thereto.

The spherical bearing, generally indicated at 14, provides a universal mounting for the tracer spindle 17 from the lower end of which depends tracer tip 18 secured thereto at 19.

Adjusting screw 15 threaded to the lower end of the tracer body 13 provides an adjustable support for the bearings 14, and is secured in adjusted position by the lock nut 16, said adjusting screw 15 being centrally apertured at 20 to loosely receive the depending spindle 17.

Spindle 17 intermediate its ends has a portion of increased diameter defining the annular shoulder 21, which is adapted to supportably rest upon the internal flange 22 of the supporting sleeve 23. Said sleeve has an exterior annular flange 25 which rests upon the race 24 of the bearings 14, whereby said spindle is universally mounted within the tracer body 13 at its lower end.

The upper end of the sleeve 23 is threadedly joined at 27 to the lower end of the guide tube 26; the upper end of said tube having suitably secured thereover the annular cup shaped control element 28, which has at its upper end the annular ridge 29 for operation in the manner hereafter described.

Within the tube 26 and spaced from each other are a pair of ball bushings 30 and 31 which cooperatively and slidably receive the hardened cylindrical elements 32 and 33 immovably secured to the upper portion of spindle 17, as shown in Fig. 1.

Cylindrical valve block 34 has immovably secured therein the valve sleeve 35, the lower extending threaded end 36 of which extends into the interiorly threaded washer 37, which is secured within the top of the tracer body 11 by a plurality of set screws 38.

There is provided within the sleeve 35 a vertically adjustable fluid control valve 39, which is responsive to vertical movements of the spindle 17 responsive to the surface of the template T, which vertical movements are adapted to control the flow of pressure fluid to the knee operating hydraulic cylinder and the exhaust therefrom in the manner hereafter described.

The upper end of the spindle 17 has a central elongated bore 40 opening to the upper end of said spindle, the lower end of said bore having a conically shaped notch 41 supporting the ball 42.

Vertically adjustable control rod 44 has an inverted conical notch 43 at its lower end which engages over the ball 42 and is thereby adapted for transmitting vertical adjustments of the spindle 17 to the control valve 39.

Cylindrical block 46 has a conical opening 45 to receive the end of the control rod 44 which is positioned loosely within the bore 40 of the spindle 17 at the upper portion thereof. The block 46 is secured centrally to and in axial alignment with valve 39 by means of the threaded bolt 47, which depends from said valve and threadedly engages block 46.

The circular cap 48 is positioned at the top of the block 34 with a portion thereof extending thereinto over the upper end of the sleeve 35, said cap having a downwardly depending exteriorly threaded portion 49 which threadedly and adjustably engages the upper end of sleeve 35.

Cap 48 has an enlarged undercut recess 50 for housing the coiled spring 53, the lower end of which cooperatively bears against valve 39. The recess 50 terminates at its upper end in a central aperture of reduced dimension for loosely receiving the upright axially aligned valve stem 51, which threadedly engages the upper end of said valve at 52.

In operation a suitable and conventional hydraulic unit is employed which contains a fluid sump and a pump for delivering fluid under pressure through conduit 66 through the valve block 34 and for passage through corresponding openings in said block and sleeve 35 for delivery to the central annular passage 67 in valve 39. Said valve, as shown in Fig. 1, is in a central or neutral position blocking off the flow of this pressure fluid to either end of cylinder 84. This neutral position corresponds to the tracer tip 18 engaging the template T or pattern with just sufficient lateral or longitudinal pressure as will maintain through spindle 17 and control rod 44, the valve 39 in the neutral position shown.

In operation, if the tracer tip is out of contact with the template, or on the other hand is moving over the surface of the template and enters a declivity or falling surface, the valve 39 under the action of the spring 53 will move below the central position shown in Fig. 1, several thousandths of an inch, three thousandths for illustration, so that valve opening 67 will be in communication with sleeve opening 70 and a registering passageway in block 34, permitting the flow of pressure fluid through the conduit 71 which is adapted for connection to one end of a cylinder. Assuming the cylinder is vertically movable with respect to a stationary piston and piston rod, this flow of pressure fluid will effect an upward movement of said cylinder which is adapted to support a machine tool knee and two transversely and horizontally movable slides, upon which a workpiece and template T would be mounted. The upward movement will continue until the tracer tip 18 has re-established a pre-determined pressure relationship with the template, such as will re-position the valve 39 in the neutral position shown in Fig. 1, cutting off further flow of pressure fluid through conduit 71.

During the flow of pressure fluid through conduit 71 to the upper end of said cylinder there will be a return exhaust flow of fluid from the opposite end of said cylinder through conduit 69 returning said fluid to the block 34 and through the sleeve passage 68 and into the annular valve passage 72, which in said negative position is below the position shown in Fig. 1. This exhaust flow from passage 72 passes through sleeve passage 74 and through the block connecting exhaust conduit 75, and conduit 77, which returns said exhaust fluid to such hydraulic unit.

Should the tracer tip when traversing over the surface of the pattern or template encounter a rise in the surface thereof, this will effect an upward movement of the spindle 17, which will be transmitted through the ball 42 and rod 44 to the valve 39 moving the same above the neutral position shown in Fig. 1. This is a positive deflection.

In this position of the valve 39, the pressure fluid receiving passage 67 will be in communication with sleeve opening 68 and the cylinder conduit 69 for delivering pressure fluid to the lower end of said cylinder. This causes a downward movement of said cylinder which will continue until the pressure of contact between the tracer tip and the pattern is reduced to its original condition as will permit the valve 39 to return to its neutral position shown in Fig. 1 under the action of spring 53.

During this downward movement of said cylinder, there will also be a flow of exhaust fluid from the upper end of said cylinder through the conduit 71 back to the block 34 and through sleeve passage 70, which will communicate with the annular valve opening 73, due to the elevation of valve 39 above referred to. The exhaust flow from passage 73 will then pass through sleeve passage 76 and exhaust pipe 75′ for return through exhaust conduit 77 back to said hydraulic unit.

To prevent seepage of fluid down into the interior of the tracer body 11, there is provided adjacent opposite ends of the valve, a pair of annular passages 78 and 80 which are respectively in communication with the sleeve openings 79 and 81, and which are both connected to the vacuum line 84 for returning this seepage to said hydraulic unit.

The present three dimension tracer is adapted to simultaneously control the movements of a second cross slide mounted on said knee as well as a longitudinal top slide adapted to carry a workpiece and the template T.

There is an identical and separate valve and control mechanism for operating said second hydraulic cylinder, however its structure will not be described in detail as it is the same as and operates the same as the control mechanism shown in Fig. 1.

Referring to Fig. 1, there is provided valve block 90 having secured therein the apertured sleeve 91, the left hand extension of which is threaded at 92 into the ring 93 suitably secured within a corresponding circular aperture upon one side of the tracer body 11.

Longitudinally reciprocal valve 94 having a plurality of longitudinally spaced annular passages 95, 96, 97, is adjustably positioned within said sleeve for controlling the flow of pressure fluid from said hydraulic unit to opposite ends of a top slide controlling cylinder, which is adapted to reciprocate with respect to a stationary piston and whose piston rod is suitably anchored to said cross slide.

The sleeve 91 has a plurality of longitudinally spaced annular passages 98, 99, 100, 101, 101′, 102 and 103 formed therein for facilitating the control and flow of pressure fluid in a manner substantially the same as that above described in conjunction with the operation of valve 39 within its sleeve 35.

Said hydraulic unit delivers pressure fluid through conduit 105 to the block 90 for communication with sleeve passage 98. This passage has fluid communication with the central valve passage 96, and in the neutral position of valve 94 there will be no flow of this pressure fluid to either end of said cylinder.

In operation, with the tracer tip 18 manually traversing the surface of the template T or pattern, any positive or lateral deflection to the left of the template as shown in Fig. 1, transmitted through the spindle 17 and the bearing 14 will effect a corresponding control movement to the right of the control cap 28 for effecting movement to the right of the valve 94 from the neutral position, shown in Fig. 1.

Pressure fluid in valve opening 96 will then be in communication with the sleeve passage 100, which is joined by the conduit 106, which is adapted for connection to one of said cylinders. This will cause a movement to the right of said cylinder and said top slide and the template thereon tending to reduce this increased pressure engagement with the tracer tip 18, which caused deflection thereof to thereby reduce the deflection of the spindle 17 and permit the same to return to the neutral position shown in Fig. 1, which will in turn cause the valve 94 to return to the neutral position shown in Fig. 1.

Under this above described positive deflection with pressure fluid flowing to said cylinder through conduit 106 there would be a corresponding exhaust flow of fluid from said cylinder and through conduit 107 back to the block 90 for communication with the exhaust opening 99 in sleeve 91 for delivering this exhaust fluid to valve opening 95. Thence this exhaust fluid will flow through a suitable aperture in said sleeve communicating with sleeve opening 101, which in turn communicates with exhaust conduit 152 back to said hydraulic unit.

On the other hand should the tracer tip 18 in being manually traversed over the template enter a declivity, such as would permit a tilting of the tracer tip to the right, this movement through the spindle 17 and bearings 14 would permit a corresponding movement to the left of the control cap 28 and would permit a movement to the left of the valve 94, in the manner hereafter described, under the action of the coiled spring 114 and tie bar 160.

This movement to the left of valve 94 from the position shown in Fig. 1, would permit the pressure fluid in valve passage 96 to flow into the sleeve opening 99 and through the conduit 107 to the opposite end of said cylinder causing said cylinder to move to the left.

This movement to the left would cause a similar movement to the left of the template increasing the lateral pressure engagement thereof with the tracer tip 18 returning the same to the position shown in Fig. 1, in turn translating the control cap 28 in the opposite direction to again return valve 94 to the neutral position shown in Fig. 1.

Here also with the negative deflection of the tracer tip 18 causing flow of pressure fluid through pipe 107, there will be an exhaust return flow through conduit 106 to the block 90. This exhaust flow will enter sleeve passage 100 and valve passage 97 for communication with sleeve opening 101' for returning the exhaust fluid through the exhaust conduit 152 to said hydraulic unit.

Any seepage towards the opposite ends of valve 94 will enter the outer annular passages adjacent the opposite ends of valve 94, which are in communication respectively with the sleeve openings 102 and 103. The exhaust pipe 141 is adapted for connection to a vacuum producing means within said hydraulic unit, forming no part of the present invention, and is connected at its opposite end to the sleeve openings 102 and 103 to thereby scavenge such seepage back to the hydraulic unit.

Referring to Fig. 1, sleeve 91 has a cap 112 which is threaded thereinto at 113, said cap having an undercut bore for receiving the spring 114, which bears against the right end of valve 94 tending to urge the same to the left.

Valve 94 has an extension 115 which is interiorly threaded to receive the valve stem 116, which is adjustably positioned through said valve and may be secured in any desired relative adjusted position by the lock nut 117. The stem 116 has a transverse screw driver receiving slot 118 upon the end thereof to permit rotary adjustment of said stem with respect to the valve 94 to thereby obtain the correct adjustment of said valve within its sleeve in setting up the device. This adjusting mechanism is enclosed within the hollow housing 119, which is secured to the end of the said sleeve by a plurality of screws 120.

Valve stem 116 at its left end has a cylindrical piston 121 adjustably positioned within the bore 122 in valve 94. The outer end of piston 121 cooperatively engages and is biased against the annular ridge 29 of control cap 28 by the coiled spring 114, which acts upon the opposite end of valve 94. Consequently, tilting movements of the control cap 28 are adapted to control reciprocal control movements of valve 94 for regulating the flow of pressure fluid to opposite ends of said cylinder with the tracer tip 18 responding to certain changes in the surface of the template as the spindle 17 is manually traversed thereover.

Elongated pin 131 has an elongated cylindrical head 132 which cooperatively engages the annular ridge 29 on the valve operator cup 28.

Cylindrical head or stop 132 is longitudinally movable within the bore of the sleeve 133 threaded into block 11 as at 134, and is secured in position by lock nut 135.

Adjustable nut 136 is threadably adjustable within sleeve 133 and loosely receives the pin 131, which projects from the stop 132. Nut 136 has a bore adapted to receive one end of coiled spring 138, the other end of which bears against the shoulder on stop 132, normally urging said stop to the position shown in Fig. 1.

The sleeve 133 is adjustable for regulating the innermost position of adjustment of stop 132; and the nut 136 is adjustable for regulating the compression in spring 138, there being a suitable lock nut 137 provided upon nut 136. The cap 139 surrounds the outer end of said sleeve and nuts, and threadedly engages a portion of said sleeve adjacent lock nut 135.

While the coiled spring 114 is adapted to normally urge member 121 on valve 94 into continuous engagement with the rim 29 of control button 28, nevertheless to assure the follow-up of said valve on tilting movements to the left of said button, there is provided a tie bar 160, which is of inverted U-shape and which is apertured at 161 to loosely receive control rod 44. One side of tie bar 160 is connected to valve element 121 by the pin 162 suitably secured thereto, and the opposite side of said tie bar is connected to the stop 132 as by the interconnecting pin 163.

By this construction, regardless of the direction of tilting of the control tube 26 under the action of spindle 17, there will be a positive displacement of the valve 94 independent of the action of spring 114.

The tracer valve 94 within sleeve 91 together with the stop 132 comprises the control mechanism responsive to certain tilting movements of the spindle and tube 26 adapted for controlling the movements of said cylinder and said top slide upon which the workpiece and template T are mounted.

As is convenient in many machine tools there is a second slide which is a cross slide adapted for movements at right angles to the direction of movement of said top slide. This slide is under the control of a second hydraulic cylinder having a relatively stationary piston and a piston rod, which is secured to some portion of said vertically adjustable knee. Corresponding to block 90 there is a second block arranged at right angles to block 90 and similarly secured to the tracer body 11. Said block contains a horizontally movable spring biased fluid control valve, which is identically the same as valve 94, Fig. 1, and operates in exactly the same manner as valve 94 for controlling the flow of pressure fluid from said hydraulic unit to opposite ends of said cross slide controling cylinder.

Said hydraulic unit delivers pressure fluid to said second valve block. Depending upon the positioning of the control valve within said block responsive to universal tilting movements of tube 26 and the operator 28, this pressure fluid will be delivered out through either of a pair of conduits selectively to opposite ends of said second cylinder. With pressure fluid delivered through one conduit, the exhaust flow from the opposite end of the second cylinder returns to this valve block through the other conduit and is exhausted back to the hydraulic unit through the other conduit.

Said hydraulic unit's vacuum producing device collects any seepage within said block returning it to said hydraulic unit. The valve within the second block also has a valve stem with a piston element similar to piston 121, Fig. 1, engaging the operator 28. Consequently, it is contemplated as a part of the present invention that both of the hydraulic control valves at right angles to each other, and operating in a horizontal plane are adapted to simultaneously control the flow of pressure fluid to both of said cylinders.

The control valve within said second block has also an extension and threaded thereto a valve stem and lock nut, all enclosed by a cap secured to said block.

Here also there is provided a spring-biased stop mechanism exactly the same as above described with respect to elements 132, 133, 136 and 138 and a second tie bar 164 of Fig. 1.

As the fluid control mechanism is identically the same as that described with respect to valve 94, Fig. 1, its detailed illustration and description is omitted.

In connection with the second control valve for regulating the control of pressure fluid to said second cylinder, there is also in conjunction with the corresponding stop 132 and the various elements 133, 136, and 138, provided a second tie bar shown at 164 in Fig. 1 and which is also vertically apertured to loosely receive control rod 44 without interfering with its operation.

The opposite ends of tie bar 164 are interconnected with the corresponding valve extension 121 and the diametrically opposed oppositely arranged stop 132 by the interconnecting pins 165. By this construction and regardless of the direction of tilting movement as effecting the second horizontally disposed valve controlling fluid to cylinder, said valve will be under positive control at all times.

In the operation of the present device, the spindle 17 and its operator tip 18 is manually traversed over and in respect to the surface of the template T, and the responses of the tracer tip and spindle to changes in the contour of the template will effect operation of the two horizontally disposed fluid control valves arranged at right angles to each other within the tracer housing and will also effect a simultaneous action of the third control valve 39 arranged at right angles thereto.

The operator rod 44 within the spindle 17 and its bore 40 is so arranged that regardless of any tilting movements of spindle 17, the operator 44 will be maintained in a perfectly upright position. Thus the tilting movements of the spindle will not effect the knee controlling valve 39 unless there is some vertical change in the template.

As shown in Fig. 1, a manual control is provided for valve 39, which includes bracket 166 upon the top of block 34 carrying operating arm 167 pivoted thereto at 168 and carrying at its inner end a yoke 169 extending upon opposite sides of the disc 170 secured to valve stem 51.

Ball detent 171 on the inner surface of arm 167 when said arm is tilted above or below the position shown, is adapted for selective registry with the depressions 172 or 173, which locate control positions of said arm and which correspond to positive or negative adjustments of valve 39 above or below the neutral position shown in Fig. 1. By this manual control, the machine tool knee operated by a cylinder, may be raised and lowered independently of the tracer contactor 18 and the template T.

Similarly, there is also provided a manual control for each of the horizontally disposed valves, such as valve 94, whereby both of said horizontal control cylinders may be manually controlled independent of the tracer contactor 18. As these manual controls are identical, one thereof will be described in connection with Fig. 1, which structure is the same as and functions in the same manner as the manual control 167.

The bracket 174 is secured at 175 to the block 90 and has pivotally mounted thereon at 177 the arm 176, the inner end of which carries a stirrup 178 adapted for moving the disc or lock nut 117 either to the right or to the left of the neutral position shown in Fig. 1.

Ball detent 179 when moved from the neutral position shown is adapted for registry within either of the depressions 180 or 181 formed in bracket 174 to thereby locate the control arm 176 corresponding to a positive or negative adjustment of valve 94 from the neutral position shown in Fig. 1.

The above description has been directed to a tracer mechanism which included the third valve 39 for controlling the operation of a vertical feed cylinder.

Figure 2:
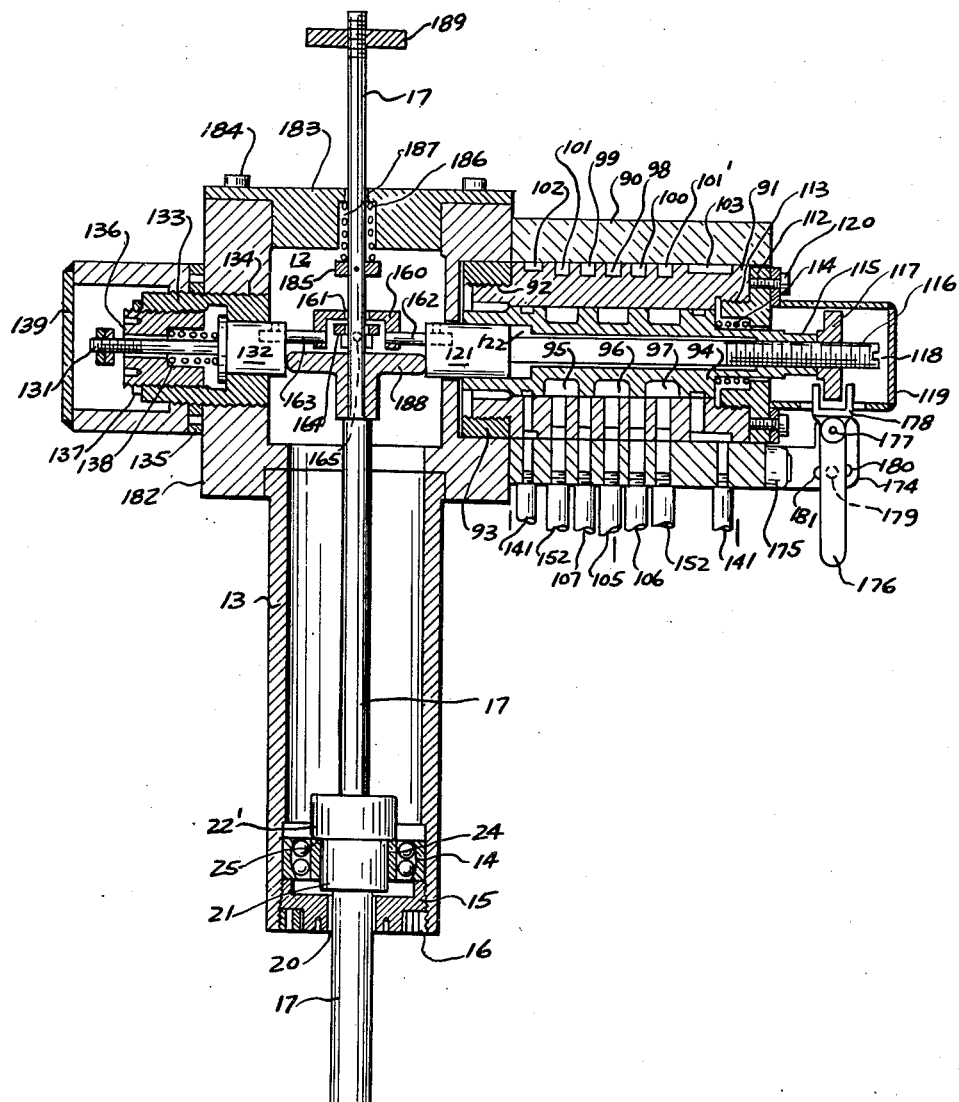
Fig. 2 is a fragmentary elevational section of a two dimensional tracer.

It is contemplated that the present tracer mechanism may be adapted for merely the control of a pair of cylinders and corresponding slides, and their connected slides. There is shown in Fig. 2 a tracer construction similar to that shown in Fig. 1, which omits the third valve.

The block 182 has a bore 12 and a depending tracer body 13, the same as that shown in Fig. 1. The spindle 17, fragmentarily shown, has a universal mounting at the lower end of element 13 which includes the bearings 14, adjusting screws 15, lock nut 16, and the bearing ring 24, upon which is supported the elongated collar 22', said collar having a shoulder 25 supportably bearing upon the bearing ring 24.

The spindle 17 projects upwardly through bore 12 and loosely through the cap 183 secured as at 184 to the top of block 182.

Disc 185, suitably secured to spindle 17, operatively receives the lower end of coiled compression spring 186, the upper portion of which is received within the bore 187 in cap 183. Said spring is adapted to maintain a continuous downward thrust upon spindle 17 to normally maintain the same in the upright axial position shown. The disc 189 is secured to the upper end of spindle 17 to facilitate manipulation thereof, if desired.

The annular control button or disc 188 is secured to spindle 17 within the bore 12 and upon one side engages the extension 121 of valve 94 and at its diametrically opposed side engages the inner end of stop 132. This construction is exactly the same as that above described in connection with Fig. 1, as is also the various ports and openings and conduits in conjunction with valve 94, and consequently this description is not repeated.

Similarly, it will be noted that a tie-bar 160 interconnects valve extension 121 and stop 132 by the pins 162 and 163 in the same manner above described.

Here also, exactly as above described in connection with Fig. 1, there is a second horizontally disposed valve, the same as valve 94 and arranged at right angles thereto and which is adapted to control the flow of pressure fluid to opposite ends of a second cylinder. The function and operation of this valve, as well as the valve extension and diametrically opposed stop arranged upon opposite sides of control disc 188 is exactly the same as that above described.

Here also, there is a second tie-bar 164, which interconnects said valve extension and stop in the same manner as above described in connection with Fig. 1.

The purpose of Fig. 2 is merely to illustrate a two dimensional tracer for controlling a pair of slides at right angles to each other.

Having described my invention, reference should now be had to the claims which follow, for determining the scope thereof.

I claim:

1. A tracer comprising an upright housing, a pattern engaging spindle having an elongated bore at its upper end universally mounted intermediate its ends within the lower end of said housing and projecting therefrom, an annular valve operator on the upper end of said spindle, a pair of horizontally disposed spring-biased fluid control valves within said housing at right angles to each other and engaging said operator at their inner ends, and responsive to tilting movements of said spindle, a third spring-biased control valve in said housing axially aligned with said spindle, an upright control rod loosely mounted at one end within the bore of said spindle and projecting thereabove with its end supportably engaging said third valve, spring-biased stops slidably mounted in said housing engaging said valve operator on the sides thereof diametrically opposed to said horizontally disposed valves normally maintaining said spindle in an upright position, and a pair of vertically spaced right angularly arranged tie-bars centrally apertured to loosely receive said control rod and with their respective ends joined to the inner ends of a horizontally disposed valve and the corresponding oppositely arranged stop, whereby said horizontally disposed valves are under positive control of said spindle throughout all universal tilting movements thereof.

2. The tracer set forth in claim 1, right angularly arranged sleeves threadedly joined to said housing and adjustable therein for slidably mounting said stops, and annular flanges on the outer ends of said stops registerable with said sleeves for limiting the inward movements thereof.

3. The tracer set forth in claim 2, nuts adjustably threaded within said sleeves, and said spring-bias comprising a coiled spring in each sleeve interposed between said nuts and said stops.

4. The tracer set forth in claim 3, and elongated stems joined to said stops and extending outwardly through said springs and loosely through and outwardly of said nuts.

5. The tracer construction set forth in claim 1, the connections between said tie-bars, valves and stops including a plurality of coplanar right angularly arranged pins.

6. A tracer for a hydraulic duplicating machine comprising an upright housing, an upright control tube loosely positioned within said housing and at its lower end universally mounted upon said housing, a pair of horizontally disposed reciprocal spring-biased fluid control valves within said housing at right angles to each other and engaging said tube at their inner ends, and responsive to tilting movements of said tube, a third spring-biased control valve in said housing axially aligned with said tube, an upright spindle having a longitudinal bore opening at its upper end supported upon and slidably disposed within said tube and projecting below said housing adapted for contacting and traversing the surface of a pattern, being vertically movable for effecting corresponding movements of said third valve and laterally movable for effecting universal tilting movements of said tube, an upright control rod loosely positioned within the bore of said spindle and supported thereon, with the upper end of said rod supportably engaging said third valve, spring-biased stops engaging the upper end of said tube on the sides thereof diametrically opposed to said horizontally disposed valves normally maintaining said tube in an upright position, and a pair of vertically spaced right angularly arranged tie-bars centrally apertured to loosely receive said control rod and with their respective ends joined to the inner ends of a horizontally disposed valve and the corresponding oppositely arranged stop whereby said horizontally disposed valves are under positive control of said spindle throughout all universal tilting movements thereof.

7. A tracer comprising an upright housing, a pattern engaging spindle universally mounted intermediate its ends within the lower end of said housing and projecting therefrom, an annular valve operator on said spindle within said housing, a pair of horizontally disposed spring-biased fluid control valves within said housing at right angles to each other and engaging said operator at their inner ends and responsive to tilting movements of said spindle, spring-biased stops mounted in said housing engaging said valve operator on the sides thereof diametrically opposed to said horizontally disposed valves normally maintaining said spindle in an upright position, and a pair of vertically spaced right angularly arranged tie-bars centrally apertured to loosely receive said spindle and with their respective ends joined to the inner ends of a horizontally disposed valve and the corresponding oppositely arranged stop whereby said valves are under positive control of said spindle throughout all universal tilting movements thereof.

8. The tracer of claim 7, right angularly arranged sleeves threadedly joined to said housing and adjustable therein for slidably mounting said stops, and annular flanges on the outer ends of said stops registerable with said sleeves by limiting the inward movements thereof.

9. The tracer structure of claim 8, nuts adjustably threaded within said sleeves, and said spring-bias comprising a coiled spring in each sleeve interposed between said nuts and said stops.

10. The tracer structure of claim 9, and elongated stems joined to said stops and extending outwardly through said springs and loosely through and outwardly of said nuts.

11. The tracer structure of claim 7, the connections between said tie-bars, valves and stops including a plurality of coplanar right angularly arranged pins.

References Cited in the file of this patent
UNITED STATES PATENTS

| | | |
|---|---|---|
| 2,320,905 | Bateholts | June 1, 1943 |
| 2,332,532 | Roehm | Oct. 26, 1943 |
| 2,332,533 | Roehm | Oct. 26, 1943 |
| 2,386,825 | Turchan | Oct. 16, 1945 |
| 2,433,005 | Turchan | Dec. 23, 1947 |